3,388,042
PROCESS FOR PREPARING ANDROST-4-ENE-3,17-DIONE AND ANDROSTA-1,4-DIENE-3,17-DIONE FROM STEROL COMPOUNDS BY THE ACTION OF MICROORGANISMS
Kei Arima and Gakuzo Tamura, Tokyo, and Michitaro Nagasawa, Noda-shi, and Mu Bae, Tokyo, Japan assignors to Noda Institute for Scientific Research, Noda-shi, Japan, a corporation of Japan
No Drawing. Filed Mar. 22, 1965, Ser. No. 441,893
Claims priority, application Japan, June 2, 1964, 39/30,915
24 Claims. (Cl. 195—51)

ABSTRACT OF THE DISCLOSURE

A process is provided in which a compound selected from the group consisting of (1) sterols, (2) $\Delta^4$-ene-3-one sterol derivatives, and (3) $\Delta^{1,4}$-diene-3-one sterol derivatives is subjected to the microbial action of a microorganism having a sterol decomposing ability in the presence of a compound capable of forming a chelate with iron and/or copper.

---

The present invention relates to processes for preparing androst-4-ene-3,17-dione and androsta-1,4-diene-3,17-dione, which comprises splitting off and removing the side chain of sterols and dehydrogenated derivatives in A-ring thereof by the action of microorganisms.

The two above compounds are very useful, that is, androst-4-ene-3,17-dione is of androgenic activity and androsta-1,4-diene-3,17-dione is an important intermediate in the preparation of estrone which is of estrogenic activity.

For the preparation of these 17-keto steroids, no microbial fermentation has been found to be effective, although some success has been obtained by such chemical means as chromic acid oxidation.

Hitherto, certain microorganisms have been known to be capable of decomposing sterols, but no steroidal degradation products have been clearly certified except cholest-4-en-3-one. This is because sterols are decomposed to smaller non-steroidal compounds, in a single step by microorganisms, without accumulation of any steroidal intermediates, and there has been found no adequate process for blocking the degradation system at the desired stage for carrying out the accumulation of the desired compound.

However, when a reagent capable of forming a chelate with iron or/and copper (hereafter called a chelating agent) is added to a fermentation medium in the microbial degradation of sterols, the degradation of the steroidal nucleus is inhibited, allowing accumulation of several kinds of steroidal intermediates such as (a) dehydrogenated derivatives in sterol A-ring, that is, $\Delta^4$-en-3-one derivatives and $\Delta^{1,4}$-dien-3-one derivatives, and (b) 17-keto steroids, that is, androst-4-ene-3,17-dione and androsta-1,4-diene-3,17-dione.

The essential object of the present invention is to cause the accumulation of steroidal intermediates. In part this is accomplished by adding a chelating agent to the medium where the degradation of sterols is carried out by the sterol decomposing microorganism. The desired steroid is never accumulated without adding said chelating agent.

The common pattern of sterol degradation by the sterol decomposing microorganisms is given below.

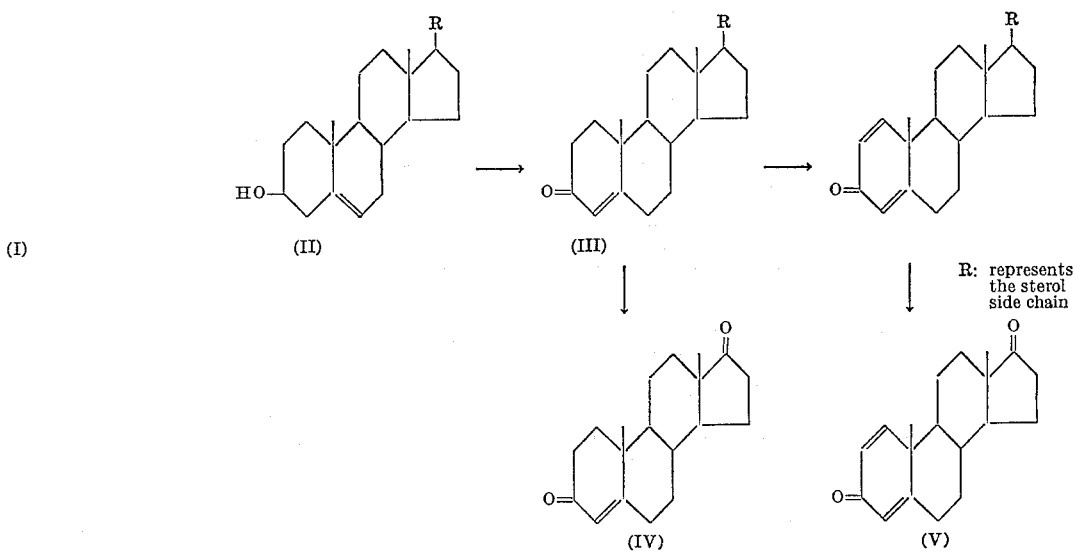

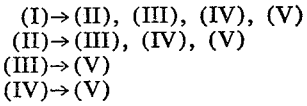

The sterol decomposing microorganism causes the following reactions, in the presence of the chelating agent, to accumulate the corresponding intermediates.

(I)→(II), (III), (IV), (V)
(II)→(III), (IV), (V)
(III)→(V)
(IV)→(V)

The starting materials according to the present invention includes (a) sterols such as cholesterol, β-sitosterol, stigmasterol, and campesterol, and (b) dehydrogenated derivatives in A-ring of said respective sterols such as cholest-4-en-3-one, cholesta-1,4-dien-3-one, stigmast-4-en-3-one, stigmasta-1,4-dien-3-one, stigmasta-4,22-dien-3-one, and stigmasta-1,4,22-trien-3-one.

A compound which makes possible the accumulation of the desired steroids by blocking the microbial degradation system for a sterol is selected from reagents capable of forming a chelate compound with iron or/and copper. Such chelating agents include the following compounds:

2,2'-dipyridyl, 2,2',2''-terpyridyl, 1,10-phenanthroline, 5-nitro-1,10-phenanthroline, 4,7-dihydroxy-1,10-phenanthroline, 4,7-diphenyl-1,10-phenanthroline, 8-hydroxyquinoline, 8-hydroxyquinoline-5-sulfonic acid, 8-hydroxyquinoline sulfate, 8-hydroxyquinaldine, 5,7-dichloro-8-hydroxyquinoline, quinaldinic acid, 2-pyridyl carbinol, pyridine-2-aldehyde, picolic acid, dipicolic acid, isonicotinic acid hydrazide, phenylene diamine, amino benzoic acid, salicyl aldoxime, α-benzoine oxime, ammonium N-nitrosophenyl hydroxylamine, diphenylthiocarbazone, sodium 1-nitroso-2-hydroxynaphthalene-3,6-disulfonate, β-resorcylic acid, 1-nitroso-2-naphthol, sodium diethyldithiocarbamate, Alizarine Blue S, ethylenediamine, ethylenediamine tetraacetic acid, acetylacetone, benzoylacetone, and dibenzoylmethane.

The microorganisms utilized in the present invention are those capable of decomposing sterols and dehydrogenated derivatives in A-ring thereof into nonsteroidal compounds. Such microorganisms include Arthrobacter, Corynebacterium, Brevibacterium, Microbacterium, Protaminobacter, Bacillus, Serratia, Pseudomonas, Nocardia, Mycobacterium, and Streptomyces.

As an important aspect of the present invention, any possible combination of (1) the starting material sterols, (2) the chelating agent and (3) the sterol decomposing agent according to the description of the present specification is effective for the accumulation of the desired steroids.

The process of the present invention for the preparation of 17-ketosteroids is also available for preparing (a) cholesta-1,4-dien-3-one from cholesterol or cholest-4-en-3-one, (b) stigmasta-1,4-dien-3-one from sitosterol or stigmasta-4-en-3-one, and (c) stigmasta-1,4,22-trien-3-one from stigmasterol or stigmasta-4,22-dien-3-one.

A suitable culture method in the practice of the present invention is (a) one step process for carrying out the culture of microorganism and the decomposition of substrate in the same medium or (b) two step process for carrying out the culture of microorganism in a medium, collecting and transferring it to another medium, and therein decomposing the substrate. The culture of microorganism can well be achieved in or out of the presence of the substrate, but the copresence of the substrate is preferable for strengthening the decomposing power. Most of the substrates are added before or after the completion of cell growth. The substrate is added to the medium in the form of fine particles, in the form in a solution of various solvents such as ethyl alcohol, acetone, propylene glycol, N,N-dimethylformamide, dioxane and the like, or in the form of a fine particle suspension in an aqueous solution prepared by sonic oscillation.

The chelating agent can effectively be applied alone or as an appropriate combination of two or more. The addition may preferably be made after the completion of cell growth in the form of a solution of various solvents such as ethyl alcohol, acetone, propylene glycol, and the like. In the combination of the chelating agent and the microorganism, the amount of addition is determined in the range of $10^{-1} \sim 10^{-6}$ molar concentration for not suppressing the activity of the microorganism and carrying out the effective accumulation of the desired steroids.

After the completion of the culture, the desired steroids which are formed and accumulated in the medium can be removed according to the per se known process. For example, the fermentation broth is extracted with ethyl acetate and after distilling off the solvent under reduced pressure, the extract is adsorbed on the column of alumina or silica gel. Thereafter the column is subjected to fractional elution with an appropriate combination of solvents such as petroleum ether, benzene, chloroform, ethyl ether, ethyl alcohol, methyl alcohol and the like.

After distilling off the solvent from the effluent, the desired steroids can be crystallized out by treating the residual oily products with ethyl acetate benzene and the like. The separation of the desired steroids is successfully carried out also by the thin layer chromatography on alumina silica gel and the like or the counter current distribution technique.

Illustrative examples are given below only for the purpose of more detailed explanation of the present invention, but not limiting the versatility of the present invention.

The composition of the medium used in the examples is given, below.

Medium A

| | | |
|---|---|---|
| Yeast extract | percent | 0.5 |
| Meat extract | do | 0.5 |
| Peptone | do | 0.5 |
| $K_2HPO_4$ | do | 0.2 |
| $MgSO_4 \cdot 7H_2O$ | do | 0.1 |
| $FeSO_4 \cdot 7H_2O$ | do | 0.01 |
| Tap water. | | |
| pH | | 7.0~7.4 |

Medium B

| | | |
|---|---|---|
| Yeast extract | percent | 0.5 |
| $NH_4NO_3$ | do | 0.1 |
| $MgSO_4 \cdot 7H_2O$ | do | 0.03 |
| $K_2HPO_4$ | do | 0.03 |
| $FeSO_4 \cdot 7H_2O$ | do | 0.01 |
| NaCl | do | 0.01 |
| Tap water. | | |
| pH | | 7.0~7.4 |

The abbreviated words of the strain in the examples represent the following collections.

IAM—The Instituted of Applied Microbiology, University of Tokyo (Mukogaoka-Yayoicho, Bunkyo-ku, Tokyo).

IFO—Institute for Fermentation (Jūso, Nishinomachi, Higashiyodogawa-ku, Osaka).

NI—Nagao Institute (380 Mishuku, Setagaya-ku, Tokyo).

ATCC—American Type Culture Collection (12301 Parklawn Drive, Rockville, Md. 20852).

EXAMPLE 1

Arthrobacter simplex IAM 1660 inoculated from an agar slant culture into a fermentation flask containing 500 ml. of A-medium was subjected to shaking culture at 30° C. for 30 hours.

The fermentation broth thus precultured was aseptically transferred into a fermentation jar containing 10 l. of the medium and was subjected to submerged culture at 30° C. for 20 hours. 10 g. of the sterilized fine powder of cholesterol were aseptically added into this fermentation broth and, after the lapse of 3 hours, 1.56 g. of 2,2'-dipyridyl in 50 ml. of acetone were added. After the broth was subjected to submerged culture under shaking at 30° C. for 120 hours, the cuture was completed.

The fermentation broth was extracted three times with an equal volume of ethyl acetate respectively and the extract was subjected to distillation in vacuo to distill off the most part of the solvent and, thereafter, was developed with a mixture of chloroform and ethyl ether (10:1) on a thin layer plate of Silica Gel G, to separate the formed steroids. A portion of Silica Gel G holding each steroid on the chromatogram was stripped off, collected, extracted with ethyl acetate and, after condensing, crystallized out. The separated steroids are of 4 kinds, were identified as cholest-4-en-3-one, cholesta-1,4-dien-3-one, androst-4-ene-3,17-dione and androsta-1,4-diene-3,17-dione, which have such properties as shown in the following table. The quantitative analysis was made by gas-liquid chromatography on SE-30 column.

| Product | Steroid Identified | Elemental Analysis | M.P., degrees | U.V. | $R_f$ value Silica Gel G | Color $H_2SO_4$ Heat | Yield (Gaschro analysis), percent |
|---|---|---|---|---|---|---|---|
| (1) | Cholest-4-en-3-one | C:84.51 H:11.58 | 79~80 | $\lambda EtoH_{211m}$ $\epsilon$ 16,000 | 0.85 | Yellow | 25 |
| (2) | Cholesta-1,4-dien-3-one | C:84.52 H:11.07 | 111~112 | $\lambda EtoH_{243m}$ $\epsilon$ 16,200 | 0.75 | Yellowish brown | 30 |
| (3) | Androst-4-ene-3,17-dione | C:79.65 H:9.17 | 173~174 | $\lambda EtoH_{241m}$ $\epsilon$ 16,500 | 0.48 | Green | 3 |
| (4) | Androsta-1,4-diene-3,17-dione | C:80.60 H:8.51 | 141~142 | $\lambda EtoH_{243m}$ $\epsilon$ 16,000 | 0.35 | Red | 10 |

EXAMPLE 2

Arthrobacter simplex IAM 1660 inoculated into a fermentation flask containing 20 ml. of A-medium was subjected to shaking culture at 30° C. for 30 hours. Three flasks of this solution were prepared. 10 mg. each of the sterilized fine powder of cholest-4-en-3-one, cholesta-1,4-dien-3-one and androsta-4-ene-3,17-dione were aseptically added into the three flasks respectively and, after the lapse of 5 hours, 1.56 mg. of 2,2'-dipyridyl dissolved in 0.5 ml. of acetone were added. Then, after completing the shaking culture at 30° C. for 120 hours, the fermentation broth was taken out and extracted with twice the equal volume of ethyl acetate. The extract was developed with the mixture of chloroform and ethyl ether (10:1) on the thin layer plate of Silica Gel G, to separate the formed steroids.

EXAMPLE 3

In 200 ml. of A-medium wherein 20 mg. of cholesterol were suspended as fine particles by sonic oscillation, Arthrobacter simplex IAM 1660 was cultured as in Example 1 and the obtained cell was collected by centrifugation. The wet weight of the cell was 2.1 g. In a series of test tubes, each containing 5 ml. of aqueous suspension of 0.1% cholesterol in fine particles, the respective chelating agents were dissolved in such a concentration as given in the following table, 100 mg. of the microorganism were added, and the test tubes were shaken at 30° C. for 120 hours. The formed steroids in the broth were detected in the same manner as in Example 2.

| Chelating Agent | Concentration, mM. | Steroid Produced | | | |
|---|---|---|---|---|---|
| | | Cholest-4-en-3-one | Cholesta-1,4-dien-3-one | Androst-4-ene-3,17-dione | Androsta-1,4-diene-3,17-dione |
| 2,2'-dipyridyl | 1 | O | O | O | O |
| 1,10-phenanthroline | 1 | O | O | O | O |
| 5-nitro-1,10-phenanthroline | 1 | O | O | O | O |
| 8-hydroxyquinoline | 1 | O | O | O | O |
| 8-hydroxyquinoline sulfate | 1 | O | O | O | O |
| Isonicotinic acid hydrazide | 1 | O | O | O | O |
| Na-diethyl-dithio-carbamate | 10 | O | O | O | O |
| Pyridine-2-aldehyde | 10 | O | O | | O |
| 2-pyridyl carbinol | 10 | O | O | | O |
| $NH_4$-nitrosophenyl hydroxamine | 10 | O | O | | O |
| o-Amino benzoic acid | 10 | O | O | | O |
| Quinoline-2-carboxylic acid | 10 | O | O | | O |
| Alizarine Blue S | 10 | O | O | | O |
| o-Phenylene diamine | 10 | O | O | | O |
| m-Phenylene diamine | 10 | O | O | | O |
| p-Phenylene diamine | 10 | O | O | | O |

The circle mark indicates that the formation was explicitly certified.

The detection of each formed steroid on the thin layer chromatogram was carried out by (1) developing color under heating at 100° C. for 10 minutes after spraying a concentrated sulfuric acid or by (2) spraying 2,4-dinitro phenyl hydrazine (DNPH) dissolved in a solution of hydrochloric acid and ethyl alcohol, in comparison with the equivalent authentic steroid. The quantitative analysis was made by the gas-liquid chromatography on SE–30 column.

| Steroid | Color developed | | $R_f$ developed with $CHCl_3$-Ether (10:1) |
|---|---|---|---|
| | (1) $H_2SO_4$, heating | (2) DNPH | |
| Cholesterol | Purple | | 0.53 |
| Cholest-4-en-3-one | Yellow | Yellow | 0.85 |
| Cholesta-1,4-dien-3-one | Brown | do | 0.75 |
| Androst-4-ene-3,17-dione | Green | do | 0.48 |
| Androsta-1,4-diene-3,17-dione | Red | do | 0.35 |

| Starting Material | Steroid Produced | | |
|---|---|---|---|
| | Cholesta-1,4-dien-3-one | Androst-4-ene-3,17-dione | Androsta-1,4-diene-3,17-dione |
| Cholest-4-en-3-one | 3.1 mg | 50 μg | 520 μg |
| Cholesta-1,4-diene-3-one | | | 1.1 mg |
| Androst-4-ene-3,17-dione | | | 5.2 mg |

In the degradation of cholesterol with the sterol decomposing microorganism in this experiment, it is demonstrated that, in the copresence of a compound capable of forming a chelate with iron or/and copper, several kinds of steroids are accumulated as the degradation products and, in spite of difference in structure, these chelating agents have the same role from a functional point of view, that is, for the accumulation of the steroidal degradation products.

EXAMPLE 4

In flasks containing 20 ml. of A- and B-medium respectively, 0.1% of cholesterol was suspended as fine particles, several kinds of sterol decomposing microorganisms were inoculated according to the combinations in the following table and, after completing the shaking culture 30° C. for 30~48 hours, 3.12 mg. of 2,2'-dipyridyl dissolved in 0.2 ml. of acetone were aseptically added. Then, the shaking was carried out at 30° C. for 120 hours. The formed steroids in the fermentation broth were detected according to the process in Example 3.

The present experiment has shown that various steroil decomposing microorganisms have the common degradation system for cholesterol and the degradation products of the same kind were accumulated by the addition of the chelating agent.

| Microorganism | Medium | Steroid Produced | | | |
|---|---|---|---|---|---|
| | | Cholest-4-en-3-one | Cholesta-1,4-dien-3-one | Androst-4-ene-3,17-dione | Androsta-1,4-diene-3,17-dione |
| Arthrobacter simplex, IAM-1660 | A | ○ | ○ | ○ | ○ |
| Corynebacterium equi, IAM-1038 | A | ○ | ○ | ○ | ○ |
| Brevibacterium lipolyticum, IAM-1398 | A | ○ | ○ | --------- | ○ |
| Microbacterium lacticum, IAM-1640 | A | ○ | ○ | ○ | ○ |
| Protaminobacter alboflavus, IAM-1040 | A | ○ | ○ | ○ | ○ |
| Bacillus roseus, IAM-1257 | A | ○ | ○ | ○ | ○ |
| Bacillus sphaericus, ATCC-7055 | A | ○ | ○ | --------- | ○ |
| Serratia marcescens, IAM-1255 | A | ○ | ○ | --------- | ○ |
| Nocardia gardneri, IAM-0105 | B | ○ | ○ | --------- | ○ |
| Nocardia minima, IAM-0374 | B | ○ | ○ | --------- | ○ |
| Nocardia corallina, IFO-3338 | B | ○ | ○ | --------- | ○ |
| Nocardia erythropolic, NI-9110 | B | ○ | ○ | --------- | ○ |
| Norcardia lutea, NI-9113 | B | ○ | ○ | --------- | ○ |
| Nocardia medurae, NI-9108 | B | ○ | ○ | --------- | ○ |
| Mycobacterium avium, IFO-3082 | A | ○ | ○ | ○ | ○ |
| Mycobacterium phlei, IFO-3158 | A | ○ | ○ | --------- | ○ |
| Mycobacterium smegmatis, IFO-3083 | A | ○ | ○ | ○ | ○ |
| Streptomyces rubesiens, IAM-0074 | B | ○ | ○ | --------- | ○ |

The circle mark indicates that the formation was explicitly certified.

EXAMPLE 5

The substrate of the medium in Example 4 was replaced by β-sitosterol in this example. The operation was carried out in the same manner as in Example 4 and the degradation products were detected. The formed steroids were certified in comparison with the authentic steriod.

The present experiment has shown that various sterol decomposing microorganisms have the common degradation system for sitosterol and the degradation products are accumulated in the copresence of the chelating agent.

EXAMPLE 6

The substrate of the medium in Example 4 was replaced by stigmasterol in this example. The operation was carried out in the same manner as in Example 4 and the degradation products were detected. The formed steroids were certified in comparison with the authentic steriod.

The present experiment has shown that various sterol decomposing microorganisms have the common degradation system for stigmasterol and the degradation products are accumulated in the copresence of the chelating agent.

| Microorganism | Medium | Steroid Produced | | | |
|---|---|---|---|---|---|
| | | Stigmast-4-en-3-one | Stigmasta-1,4-dien-3-one | Androst-4-ene-3,17-dione | Androsta-1,4-diene-3,17-dione |
| Arthrobacter simplex, IAM-1660 | A | ○ | ○ | ○ | ○ |
| Corynebacterium equi, IAM-1038 | A | ○ | ○ | ○ | ○ |
| Corynebacterium spedonicum, IFO-3306 | A | ○ | ○ | --------- | ○ |
| Brevibacterium lipolyticum, IAM-1398 | A | ○ | ○ | ○ | ○ |
| Microbacterium lacticum, IAM-1604 | A | ○ | ○ | --------- | ○ |
| Protaminobacter alboflavus, IAM-1040 | A | ○ | ○ | --------- | ○ |
| Bacillus roseus, IAM-1257 | A | ○ | ○ | ○ | ○ |
| Bacillus sphaericus, ATCC-7055 | A | ○ | ○ | --------- | ○ |
| Serratia marcesiens, IAM-1255 | A | ○ | ○ | --------- | ○ |
| Nocardia gardneri, IAM-0105 | B | ○ | ○ | --------- | ○ |
| Nocardia minima, IAM-0374 | B | ○ | ○ | --------- | ○ |
| Nocardia corallina, IFO-3338 | B | ○ | ○ | --------- | ○ |
| Nocardia erythropolis, NI-9110 | B | ○ | ○ | --------- | ○ |
| Nocardia lutea, NI-9131 | B | ○ | ○ | --------- | ○ |
| Nocardia medurae, NI-9108 | B | ○ | ○ | --------- | ○ |
| Mycobacterium avium, FIO-3038 | A | ○ | ○ | ○ | ○ |
| Mycobacterium phlei, IFO-3158 | A | ○ | ○ | --------- | ○ |
| Mycobacterium smegmatis, IFO-3083 | A | ○ | ○ | ○ | ○ |
| Streptomyces rubescens, IAM-0074 | B | ○ | ○ | --------- | ○ |

The circle mark indicates that the formation was explicitly certified.

| Steroid | Color developed | | $R_f$ developed with $CHCl_3$·Ether (10:1) |
|---|---|---|---|
| | (1) $H_2SO_4$, heating | (2) DNPH | |
| β-Sitosterol | Reddish purple | --------- | 0.52 |
| Stigmast-4-en-3-one | Yellow | Yellow | 0.85 |
| Stigmasta-1,4-dien-3-one | Brown | do | 0.73 |
| Androst-4-ene-3,17-dione | Green | do | 0.48 |
| Androsta-1,4-diene-3,17-dione | Red | do | 0.35 |

| Steroid | Color developed | | $R_f$ Developed with $CHCl_3$·Ether (10:1) |
|---|---|---|---|
| | (1) $H_2SO_4$, heating | (2) DNPH | |
| Stigmasterol | Bluish purple | --------- | 0.52 |
| Stigmasta-4,22-dien-3-one | Dark brown | Yellow | 0.85 |
| Androst-4-ene-3,17-dione | Green | do | 0.48 |
| Stigmasta-1,4,22-trien-3-one | Brown | do | 0.73 |
| Androsta-1,4-diene-3,17-dione | Red | do | 0.35 |

| Microorganism | Medium | Steroid Produced | | | |
|---|---|---|---|---|---|
| | | Stigmasta-4,22-dien-3-one | Stigmasta-1,4,22-trien-3-one | Androst-4-ene-3,17-dione | Androsta-1,4-diene-3,17-dione |
| Arthrobacter simplex, IAM-1660 | A | ○ | ○ | --------- | ○ |
| Corynebacterium equi, IAM-1038 | A | ○ | ○ | --------- | ○ |
| Brevibaerium lipolyticum, IAM-1398 | A | ○ | ○ | --------- | ○ |
| Microbacterium lacticum, IAM-1640 | A | ○ | ○ | --------- | ○ |
| Protaminoacter alboflavus, IAM-1040 | A | ○ | ○ | --------- | ○ |
| Bacillus sphaericus, ATCC-7055 | A | ○ | ○ | --------- | ○ |
| Serratia marcescens, IAM-1255 | A | ○ | ○ | --------- | ○ |
| Norcardia gardneri, IAM-0105 | B | ○ | ○ | --------- | ○ |
| Norcardia erythropolis, NI-9110 | B | ○ | ○ | --------- | ○ |
| Nocardia lutea, NI-9113 | B | ○ | ○ | --------- | ○ |
| Mycobacterium avium, IFO-3082 | A | ○ | ○ | ○ | ○ |
| Mycobacterium phlei, IFO-3158 | A | ○ | ○ | --------- | ○ |
| Mycobacterium smegmatis, IFO-3083 | A | ○ | ○ | ○ | ○ |
| Streptomyces rubescens, IAM-0074 | B | ○ | ○ | --------- | ○ |

The circle mark indicates that the formation was explicitly certified.

We claim:

1. The process which comprises subjecting a compound selected from the group consisting of (1) sterols (2) $\Delta^4$-en-3-one sterol derivatives and (3) $\Delta^{1,4}$-dien-3-one sterol derivatives to the microbial action of a microorganism having a sterol decomposing ability in the presence of a compound capable of forming a chelate with iron and/or copper.

2. A process in accordance with claim 1 wherein the microbial action is effected simultaneously with the culturing of the microorganism and in the culture medium.

3. A process in accordance with claim 1 wherein the microbial action is effected by culturing the microorganism in a culture medium and collecting and transferring it to another medium containing the compound to be subjected to microbial action.

4. The process as claimed in claim 1 wherein the microorganism is selected from the group consisting of Arthrobacter, Corynebacterium, Brevibacterium, Microbacterium, Protaminobacter, Bacillus, Serratia, Nocardia, Mycobacterium, and Streptomyces.

5. The process as claimed in claim 1 wherein the compound capable of forming a chelate is a member of the group consisting of 2,2'-dipyridyl, 1,10-phenanthroline, 5-nitro-1,10-phenanthroline, 8-hydroxy quinoline, pyridine-2-aldehyde, isonicotinic acid hydrazide, 2-pyridyl carbinol, o-amino benzoic acid, o-phenylene diamine, m-phenylene diamine, p-phenylene diamine, Alizarin Blue S, 8-hydroxy quinoline-5-sulfonic acid, 8-hydroxy quinoline sulfate, sodium diethyl dithio carbamate, ammonium nitrosophenylhydroxylamine, and quinoline-2-carboxylic acid.

6. The process according to claim 1 wherein at least one member of the group consisting of androst-4-ene-3,17-dione and androsta-1,4-diene-3,17-dione is produced.

7. A process as claimed in claim 1 wherein the compound subjected to microbial action is a member of the group consisting of cholesterol, cholest-4-en-3-one, cholesta-1,4-dien-3-one, sitosterol, stigmast-4-en-3-one, stigmasta-1,4-dien-3-one, stigmasterol, stigmasta-4,22-dien-3-one, stigmasta-1,4-22-trien-3-one.

8. The process as claimed in claim 1 wherein the compound subjected to microbial action is cholesterol, and at least one member of the group consisting of cholest-4-ene-3-one and cholesta-1,4-diene-3-one is produced.

9. The process as claimed in claim 8 wherein the compound capable of forming a chelate is a member of the group consisting of 2,2'-dipyridyl, 1,10-phenanthroline, 5-nitro-1,10-phenanthroline, 8-hydroxy quinoline, pyridine-2-aldehyde, isonicotinic acid hydrazide, 2-pyridyl carbinol, o-amino benzoic acid, o-phenylene diamine, m-phenylene diamine, p-phenylene diamine, Alizarin Blue S, 8-hydroxy quinoline-5-sulfonic acid, 8-hydroxy quinoline sulfate, sodium diethyl dithio carbamate, ammonium nitrosophenylhydroxylamine, and quinoline-2-carboxylic acid, and the microorganism is selected from the classes of microorganisms consisting of Arthrobacter, Corynebacterium, Brevibacterium, Microbacterium, Protaminobacter, Bacilus, Serratia, Nocardia, Mycobacterium, and Streptomyes.

10. The process as claimed in claim 1 wherein the compound subjected to microbial action is sitosterol, and at least one member of the group consisting of stigmast-4-en-3-one and stigmasta-1,4-dien-3-one is produced.

11. The process as claimed in claim 10 wherein the compound capable of forming a chelate is a member of the group consisting of 2,2'-dipyridyl, 1,10-phenanthroline, 5-nitro-1,10-phenanthroline, 8-hydroxy quinoline, pyridine-2-aldehyde, isonicotinic acid hydrazide, 2-pyridyl carbinol, o-amino benzoic acid, o-phenylene diamine, m-phenylene diamine, p-phenylene diamine, Alizarin Blue S, 8-hydroxy quinoline-5-sulfonic acid, 8-hydroxy quinoline sulfate, sodium diethyl dithio carbamate, ammonium nitrosophenylhydroxylamine and quinoline-2-carboxylic acid, and the microorganism is selected from the classes of microorganisms consisting of Arthrobacter, Corynebacterium, Brevibacterium, Microbacterium, Protaminobacter, Bacillus, Serratia, Nocardia, Mycobacterium, and Streptomyces.

12. The process as claimed in claim 1 wherein the compound subjected to microbial action is stigmasterol, and at least one member of the group consisting of stigmasta-4,22-dien-3-one and stigmasta-1,4,22-trien-3-one is produced.

13. The process as claimed in claim 12 wherein the compound capable of forming a chelate is a member of the group consisting of 2,2'-dipyridyl, 1,10-phenanthroline, 5-nitro-1,10-phenanthroline, 8-hydroxy quinoline, pyridine-2-aldehyde, isonicotinic acid hydrazide, 2-pyridyl carbinol, o-amino benzoic acid, o-phenylene diamine, m-phenylene diamine, p-phenylene diamine, Alizarin Blue S, 8-hydroxy quinoline-5-sulfonic acid, 8-hydroxy quinoline sulfate, sodium diethyl dithio carbamate, ammonium nitrosophenylhydroxylamine and quinoline-2-carboxylic acid, and the microorganism is selected from the classes of microorganisms consisting of Arthrobacter, Corynebacterium, Brevibacterium, Microbacterium, Protaminobacter, Bacillus, Serratia, Nocardia, Mycobacterium, and Streptomyces.

14. The process as claimed in claim 1 wherein the microorganism is *Arthrobacter simplex*.

15. The process as claimed in claim 1 wherein the microorganism is a member of the group of *Corynebacterium equi* and *Corynebacterium sepedonicum*.

16. The process as claimed in claim 1 wherein the microorganism is *Protaminobacter alboflavus*.

17. The process as claimed in claim 1 wherein the microorganism is *Microbacterium lacticum*.

18. The process as claimed in claim 1 wherein the microorganism is *Brevibacterium lipolyticum*.

19. The process as claimed in claim 1 wherein the microorganism is a member of the group of *Bacillus roseus* and *Bacillus sphaericus*.

20. The process as claimed in claim 1 wherein the microorganism is *Serratia marcescens*.

21. The process as claimed in claim 1 wherein the microorganism is *Streptomyces rubescens*.

22. The process as claimed in claim 1 wherein the microorganism is a member of the group of *Mycobacterium avium, Mycobacterium phlei* and *Mycobacterium smegmatis*.

23. The process as claimed in claim 1 wherein the microorganism is a member of the group of *Nocardia erythropolis, Nocardia gardneri, Nocardia minima, Nocardia corallina, Nocardia lutea* and *Nocardia medurae*.

24. The process as claimed in claim 1 wherein the compound capable of forming a chelate is a member of the group consisting of 2,2'-dipyridyl, 1,10-phenanthroline, 5-nitro-1,10-phenanthroline, 8-hydroxy quinoline, pyridine-2-aldehyde, isonicotinic acid hydrazide, 2-pyridyl carbinol, o-amino benzoic acid, o-phenylene diamine, m-phenylene diamine, p-phenylene diamine, Alizarin Blue S, 8-hydroxy quinoline-5-sulfonic acid, 8-hydroxy quinoline sulfate, sodium diethyl dithio carbamate, ammonium nitrosophenylhydroxylamine, and quinoline-2-carboxylic acid, and the microorganism is selected from the classes of microorganisms consisting of Arthrobacter, Corynebacterium, Brevibacterium, Microbacterium, Protaminobacter, Bacillus, Serratia, Nocardia, Mycobacterium, and Streptomyces.

No references cited.

ALVIN E. TANENHOLTZ, *Primary Examiner.*